(No Model.) 2 Sheets—Sheet 1.

A. WERNER.
METHOD OF AND APPARATUS FOR CHARGING LIQUIDS.

No. 490,522. Patented Jan. 24, 1893.

WITNESSES:
Chas. Nida.
C. Sedgwick

INVENTOR
A. Werner
BY Munn & Co.
ATTORNEYS.

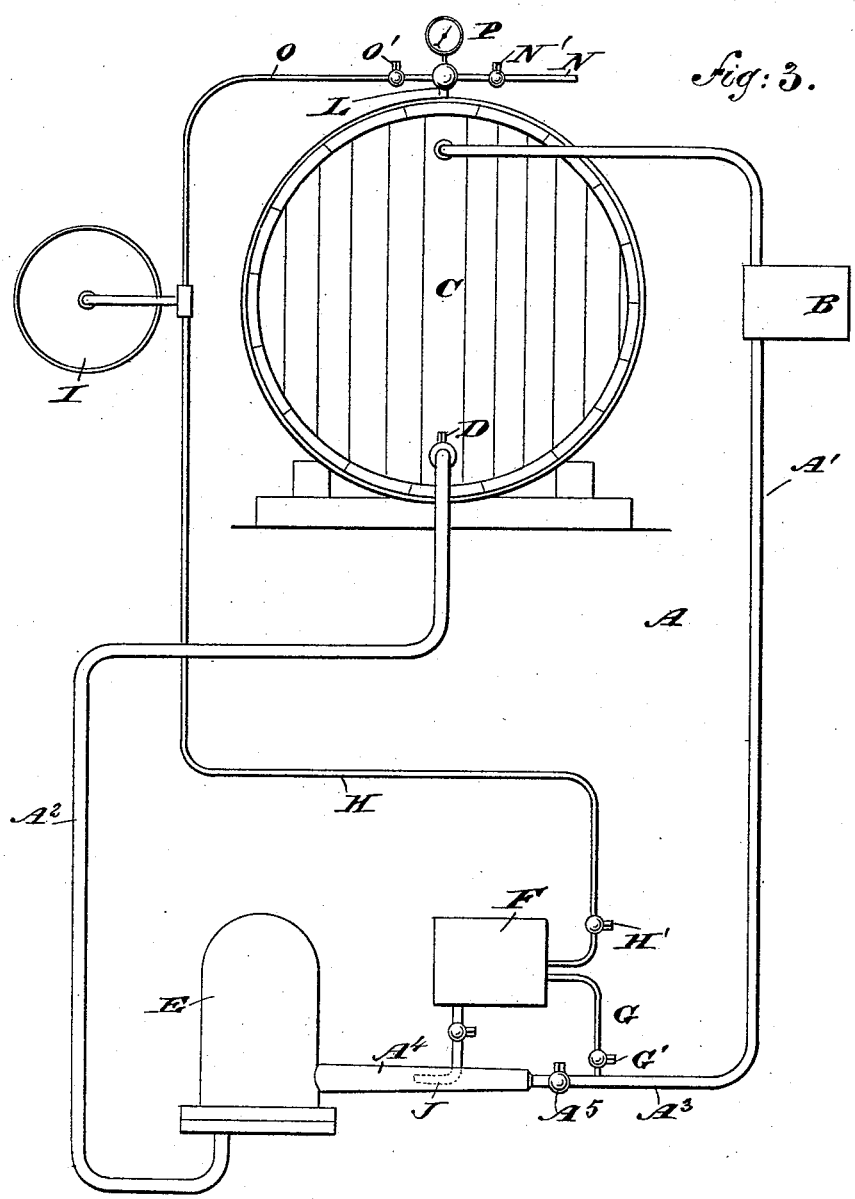

UNITED STATES PATENT OFFICE.

AUGUST WERNER, OF BROOKLYN, NEW YORK.

METHOD OF AND APPARATUS FOR CHARGING LIQUIDS.

SPECIFICATION forming part of Letters Patent No. 490,522, dated January 24, 1893.

Application filed April 29, 1892. Serial No. 431,202. (No model.)

*To all whom it may concern:*

Be it known that I, AUGUST WERNER, of Brooklyn, in the county of Kings and State of New York, have invented a new and Improved Method of and Apparatus for Charging Liquids, of which the following is a full, clear, and exact description.

The object of the invention is to provide a new and improved method of and apparatus therefor, for quickly, thoroughly and conveniently charging liquids such as wines, beers, &c., deficient in gaseous matter, with a suitable gas under pressure to increase their strength and taste.

The method consists of forming a moving column of liquid then entering the gas into the flowing liquid at or near the base of said column under the weight or hydrostatic pressure of the said column and then discharging the charged liquid into a receiving vessel at the initial pressure of the liquid at the upper end of the column.

The apparatus consists principally of a vertically disposed pipe approximately U-shaped, a pump or other equivalent device connected with one end of the said pipe to cause the liquid to flow in a column through the said pipe to a receiving vessel, a second pump or equivalent device connected with the said pipe at or near the base thereof to charge the liquid with gas under the hydrostatic pressure of the column of the flowing liquid and a gas supply connected with the said second pump.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1:
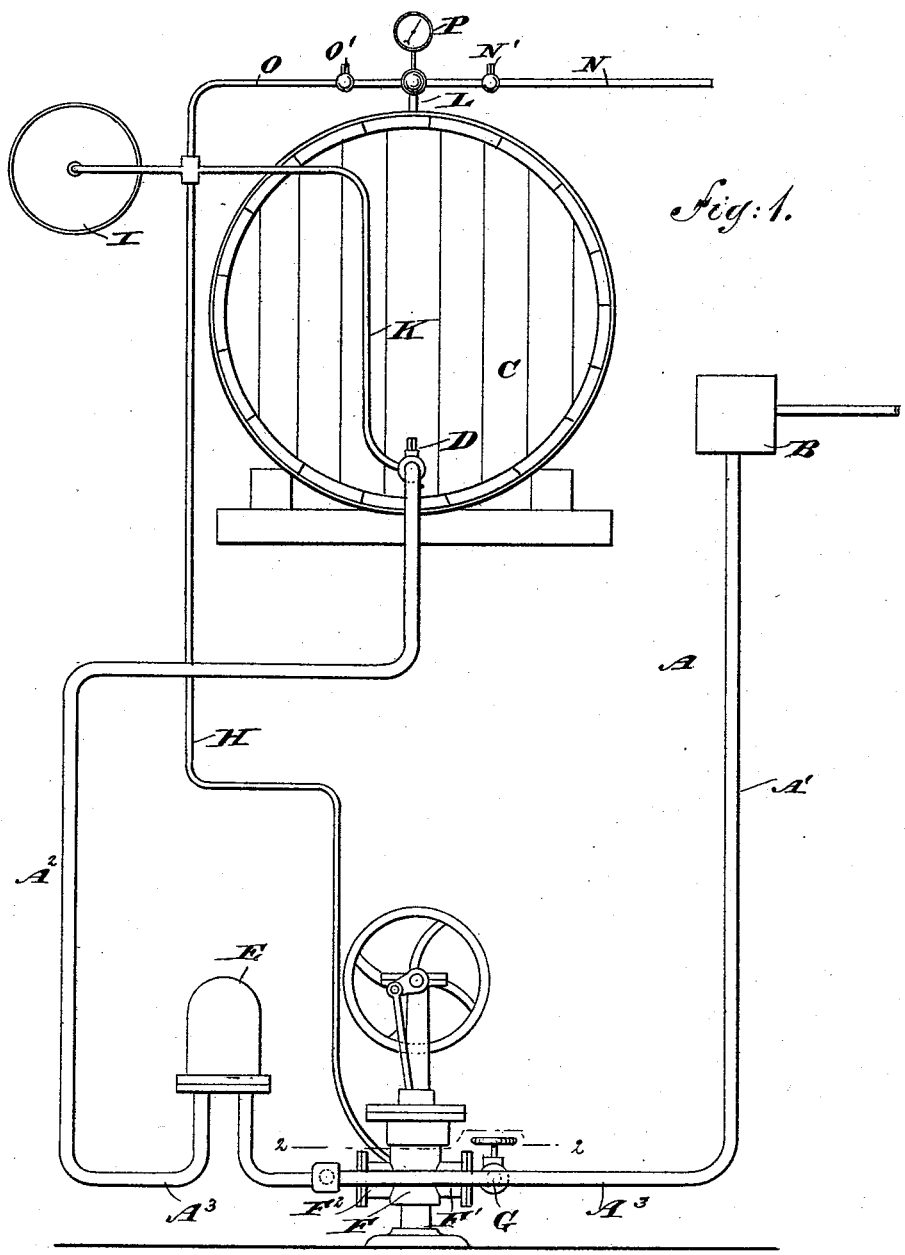
Figure 2:
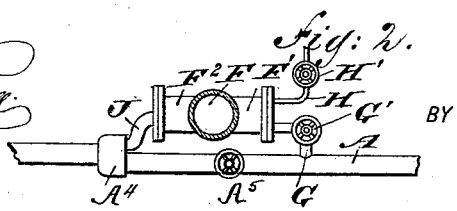

Figure 1 is a side elevation of the apparatus; Fig. 2 is a sectional plan view of the same on the line 2—2 of Fig. 1; and Fig. 3 is a side elevation of a modified form of the apparatus.

My improved process is more especially designed to charge lager beer and other liquids in large quantities, and to do away with the kraeusen, which is beer in full fermentation and full of fermenting bacteria, and is the present way to make ruh beer sparkling. Such beer, however, when finally bottled does not keep longer than from two to three weeks, while beer charged by my process and apparatus, presently to be described, will keep for months, without losing any of its sparkling or other valuable properties.

The improved apparatus is provided with a supply pipe A, connected at one end with a suitable tank, cask, barrel or other vessel containing the liquid to be charged, a pump or other equivalent device being connected with the pipe to insure the flow of the liquid through the pipe. The other end of the supply pipe A opens into the bottom of the keg, barrel, or other vessel C, to be filled with the charged liquid.

The supply pipe A is arranged vertically and bent in approximately U-shape so that the liquid passing from the supply vessel and pump B into one leg A' of the said pipe, rises in the other leg $A^2$, and flows by its own initial specific weight or pressure into the vessel C, to be filled. The charging of the liquid with the necessary gas (carbonic acid) or gaseous matter takes place at the lower end of the supply pipe, the liquid at this point being under a pressure corresponding to the weight of the column of liquid in the supply pipe A.

In the leg $A^2$ and preferably at the upper end thereof, near the vessel C, is arranged a suitable valve D, for controlling the flow of the liquid to the vessel C. A closed air or gas reservoir E, is located preferably near the middle or lower part $A^3$, of the said pipe A.

A pump F, or other equivalent device of any approved construction, is connected at its inlet F', by a pipe G, with the supply pipe A, at the middle part $A^3$, or near the lower end thereof. The inlet F' of the pump is also connected with a pipe H, connected with a gas tank I, containing the gas to be charged into the liquid flowing through the pipe A. A valve H' in the pipe H controls the flow of gas to the pump F. The outlet $F^2$ of the pump E, is provided with a nozzle J, discharging into a somewhat enlarged chamber $A^4$, formed in the supply pipe A, in the immediate neighborhood of the gas or air reservoir E, the direction of the discharge of the nozzle J, being in the direction of the flow of the liquid. Now, when the pump F is set in motion, the liquid passes into the pump from the supply pipe A through the branch pipe G, and at the same time, an amount of gas passes from the tank I, through the pipe H, into the inlet F' of the pump F, to be mixed in the pump with the liquid entering the pump through the pipe G. This mixture of gas and liquid is forced by the pump through the nozzle J into the liquid flowing under its own specific weight or pressure through the pipe A, so that the said liquid is thoroughly charged with the mixture of liquid and gas, whereby the liquid is greatly increased in strength, receives the necessary taste, &c. The liquid thus charged passes through the reservoir E, in which the final mixing will take place, without any danger of forming bubbles. The liquid then rises in the leg $A^2$ and finally flows past the valve D into the lower part of the vessel C, to fill the same. Thus, it will be seen that a liquid deficient in gaseous matters and being consequently flat, can be readily charged with the necessary amount of a suitable gas to increase its strength and to render it palatable.

The amount of liquid drawn into the pump F, to be mixed with gas, as above described, depends largely on the capacity of the pump and the position of valve G' in the pipe G. If desired, however, the entire amount of liquid in the pipe A can be passed through the pump F to be mixed with the gas in the pump and for this purpose a valve $A^5$ is provided arranged in the part $A^3$, between the chamber $A^4$, and pipe G. If the valve $A^5$ is closed and valve G' opened, all the liquid passes through the pump F to be charged therein with the gas.

It is expressly understood that the liquid flowing through the supply pipe receives the charge of gas at the time it is under the pressure of the weight of the column of liquid in the said supply pipe.

If desired, the supply pipe A can be directly connected with the upper end of the vessel C, containing the deficient or flat liquid to be charged, as shown in Fig. 3. Now, it will be readily seen that if connection is made, as shown in the said Fig. 3, and the pumps B and F are started, the liquid then flows through the supply pipe A and is charged with a mixture of liquid and gas at the nozzle J, the liquid then being under a pressure corresponding to the weight of the column of liquid. The liquid then flows back into the vessel C at the bottom thereof, under its own specific weight or pressure. The liquid is thus drawn directly from the vessel C, charged with the necessary amount of gas, and at once returned in a charged condition back to the vessel.

In order to drive the air out of the vessel C, previous to properly charging the latter with the liquid, and to maintain a certain pressure of the gas in the said vessel, the following device is provided. The gas tank I is connected by a pipe K, with the valve D, which is preferably a three-way valve for the purpose, so that gas can be passed into the vessel C. The upper end of the latter is connected with a pipe L, connected with an air discharge pipe N, having a valve N'. The inflowing gas at the bottom of the vessel C, drives the air out of the vessel at the top through the pipe N, the valve N' being opened. When the air is expelled, the valve N' is closed. A pipe O, connects the pipe L with the gas tank I, and in the said pipe O is arranged a valve O', which is closed during the time the air is expelled from the vessel. During the process of filling the vessel C with the liquid, as above described, the valve D closes the pipe K, but if it is desired to maintain a certain gas pressure within the vessel C, then the valve O' is opened so that gas can flow from the tank through the pipe O into the top of the vessel C, the pressure in the vessel being indicated by a gage P. If the gas pressure is more than desired, the valve O' is closed and the valve N' opened, to permit a part of the gas to escape from the vessel C. It is understood that by the above arrangement, the air is expelled from the vessel C, previous to filling it, and the vessel is charged with a desired amount of gas of the same nature as the one charged into the flowing liquid, as above described.

Having thus fully described my invention, I claim as new, and desire to secure by Letters Patent:—

1. The herein described method for charging liquids, consisting of forming a moving column of liquid, then entering the gas into the flowing liquid at or near the base of said column under the own weight or hydrostatic pressure of the said column and then discharging the charged liquid into a receiving vessel at the initial pressure of the liquid at the upper end of the column, substantially as shown and described.

2. The herein described method for charging liquids, consisting of forming an approximately U-shaped moving column of liquid connected at one end with a liquid containing vessel and at its other end with a liquid receiving vessel, the inflow into the latter being under the initial pressure of the outflow of the liquid from the containing vessel, then entering the gas into the moving column of liquid at or near the base thereof and against the weight or hydrostatic pressure of the said column of liquid, substantially as shown and described.

3. An apparatus for charging liquids comprising a vertically disposed pipe approximately U-shaped, a pump or other equivalent device connected with one end of the said pipe to cause the liquid to flow in a column through the said pipe to a receiving vessel, a second pump or equivalent device connected with the said pipe at or near the base thereof to charge the liquid with gas under the hydrostatic pressure of the column of the flowing liquid, and a gas supply connected with the said second pump, substantially as shown and described.

4. An apparatus for charging liquids, comprising a vertically disposed pipe approximately U-shaped and through which flows the liquid to be charged, a pump or other equivalent device connected at its inlet and outlet with the said pipe, a gas supply connected with the inlet of the said pump to mix a quantity of gas with part of the liquid, the mixture being forced by the pump through its outlet into the pipe, and a pump or other equivalent device connected with the liquid supply and discharging into the said pipe to force the liquid through the latter into the cask to be filled, substantially as shown and described.

AUGUST WERNER.

Witnesses:
THEO. G. HOSTER,
C. SEDGWICK.